United States Patent
Horejsi et al.

(10) Patent No.: US 6,409,456 B1
(45) Date of Patent: Jun. 25, 2002

(54) APPARATUS FOR RAISING AND LOWERING A LID STRUCTURE OF A COTTON RECEIVING BASKET OF A COTTON HARVESTER

(75) Inventors: Michael J. Horejsi, Sherrard, IL (US); Travis A. Schaeffer, Davenport, IA (US)

(73) Assignee: Case Corporation, Racine, WI (US)

(*) Notice: Subject to any disclaimer, the term of this patent is extended or adjusted under 35 U.S.C. 154(b) by 0 days.

(21) Appl. No.: 09/852,216

(22) Filed: May 9, 2001

Related U.S. Application Data

(60) Provisional application No. 60/260,513, filed on Jan. 9, 2001.

(51) Int. Cl.⁷ .............................................. A01D 90/12
(52) U.S. Cl. ......................... 414/495; 56/16.6; 460/119
(58) Field of Search ................................ 414/495, 486; 56/16.6; 460/119

(56) References Cited

U.S. PATENT DOCUMENTS

| | | | |
|---|---|---|---|
| 3,813,861 A | 6/1974 | Wood | 56/344 |
| 3,826,070 A | 7/1974 | Wood | 56/344 |
| 3,901,142 A | 8/1975 | Wood | 100/255 |
| 4,005,565 A | 2/1977 | Lowe et al. | 56/344 |
| 4,341,423 A | 7/1982 | Fachini et al. | 298/18 |
| 4,519,189 A | 5/1985 | Fachini et al. | 56/16.6 |
| 4,930,297 A | 6/1990 | Schlueter et al. | 56/16.6 |
| 4,996,831 A | 3/1991 | Pearson et al. | 56/16.6 |
| 5,609,523 A | 3/1997 | Ringwald et al. | 460/119 |

Primary Examiner—Steven A. Bratlie
(74) Attorney, Agent, or Firm—John William Stader; Larry W. Miller

(57) ABSTRACT

The apparatus applies to a basket having an upstanding wall structure defining an upwardly facing opening and a lid structure disposed over the opening and positionable in a retracted position close to the wall structure and in an extended position spaced a predetermined distance above the wall structure, at least one lifting element being present having a member extendable for lifting the basket relative to the frame to a lifted position and retractable for lowering the basket from the lifted position, the apparatus including at least one leg mounted to the lid structure and engageable with a portion of the lifting element when the basket is in the lifted position and the lid structure is in the retracted position so as to hold the lid structure relative to the portion of the lifting element engaged therewith while the basket is lowered from the lifted position to move the lid structure to the extended position, the at least one leg being engageable with the lifting element with the lid structure in the extended position while the basket is raised relative thereto to retract the lid structure.

15 Claims, 5 Drawing Sheets

APPARATUS FOR RAISING AND LOWERING A LID STRUCTURE OF A COTTON RECEIVING BASKET OF A COTTON HARVESTER

This application claims the benefit of U.S. Provisional Application No. 60/260,513, filed Jan. 9, 2001.

TECHNICAL FIELD

The present invention generally relates to cotton harvesters and, more particularly, to apparatus for raising or lifting a lid or lid structure of a cotton receiving basket or receptacle of a cotton harvester relative to the basket.

BACKGROUND ART

Modern cotton harvesters include relatively large high volume baskets or receptacles that are supported by a movable frame of the harvester for receiving and holding harvested cotton materials received from cotton harvester row units mounted on the frame.

The basket is typically provided with drivers for moving the basket between an operational or lower position wherein the basket is resting on or close to the frame of the harvester for receiving the cotton from the row units, and an unloading or raised position a distance above the lower position, wherein the cotton collected in the basket can be unloaded to another receptacle or container. Typically, such drivers include two or more fluid cylinders. Each fluid cylinder is typically connected to fluid supply lines connected to a source of pressurized fluid mounted on the harvester, such as a hydraulic pump. Reference in this regard, Fachini et al. U.S. Pat. No. 4,519,189, issued May 28, 1985 to J. I. Case Company, which discloses well known apparatus for raising and lowering a cotton harvester basket, including a plurality of upright fluid cylinders, the rods of which cylinders can be disconnected from the basket and attached to a roof or lid structure telescopically received in an upwardly facing opening of the basket for extending or retracting the roof or lid structure relative to the basket. Reference also, Schlueter et al. U.S. Pat. No. 4,930,297, issued Jun. 5, 1990 to Deere and Company, which discloses known apparatus for selectively telescopically raising and lowering an upper basket portion or lid of a cotton harvester hydraulically.

However, a shortcoming of the first referenced apparatus is a requirement of manually connecting and disconnecting the cylinder rods from the basket and roof, which can become difficult as the pins and receivers for doing so become old and worn. Addressing the latter referenced device, it is disclosed in cooperation with complex hydraulic apparatus for tilting the basket in a dump mode.

Accordingly, it would be desirable to provide apparatus for raising and lowering the lid structure or roof of a cotton receiving basket of a cotton harvester, which overcomes the shortcomings discussed above.

SUMMARY OF THE INVENTION

According to the invention, apparatus for raising and lowering a lid structure of a cotton receiving basket of a cotton harvester, is disclosed. The present apparatus is used with or applies to a basket having an upstanding wall structure defining an upwardly facing opening and a lid structure disposed over the opening positionable in a retracted position close to the wall structure, and in an extended position spaced a predetermined distance above the wall structure, at least one lifting element being present having a member extendable for lifting the basket relative to the frame to a lifted position and retractable for lowering the basket from the lifted position, the apparatus including at least one leg mounted to the lid structure and engageable with a portion of a lifting element when the basket is in the lifted position and the lid structure is in the retracted position so as to hold the lid structure relative to the portion of the lifting element engaged therewith while the basket is lowered from the lifted position to locate the lid structure in the extended position, the at least one leg being engageable with the lifting element with the lid structure in the extended position while the basket is raised relative thereto to retract the lid structure.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
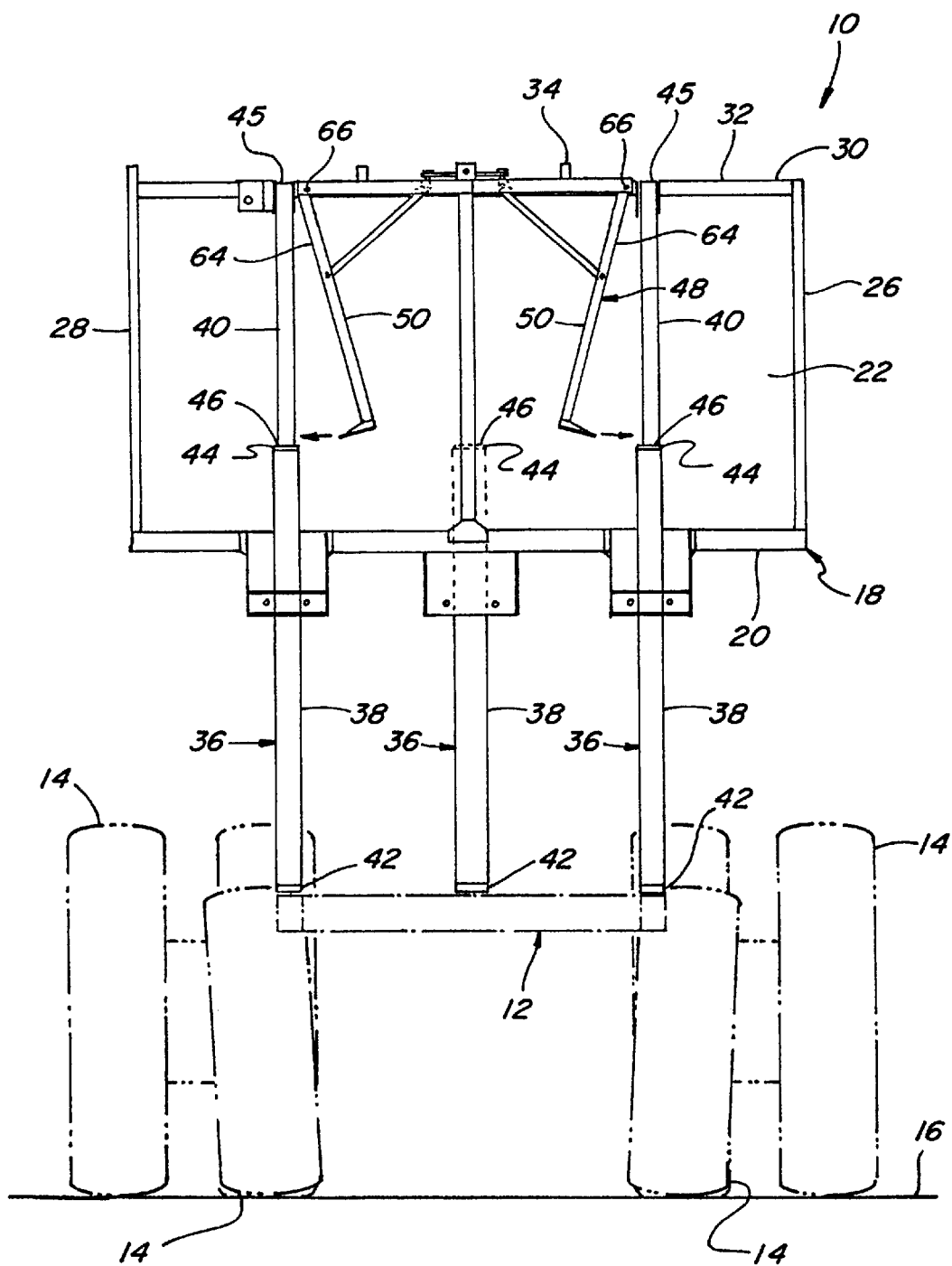
FIG. 1 is a simplified rear elevational view of a cotton harvester including apparatus for raising and lowering a lid structure of a cotton receiving basket thereof according to the present invention.
Figure 2:
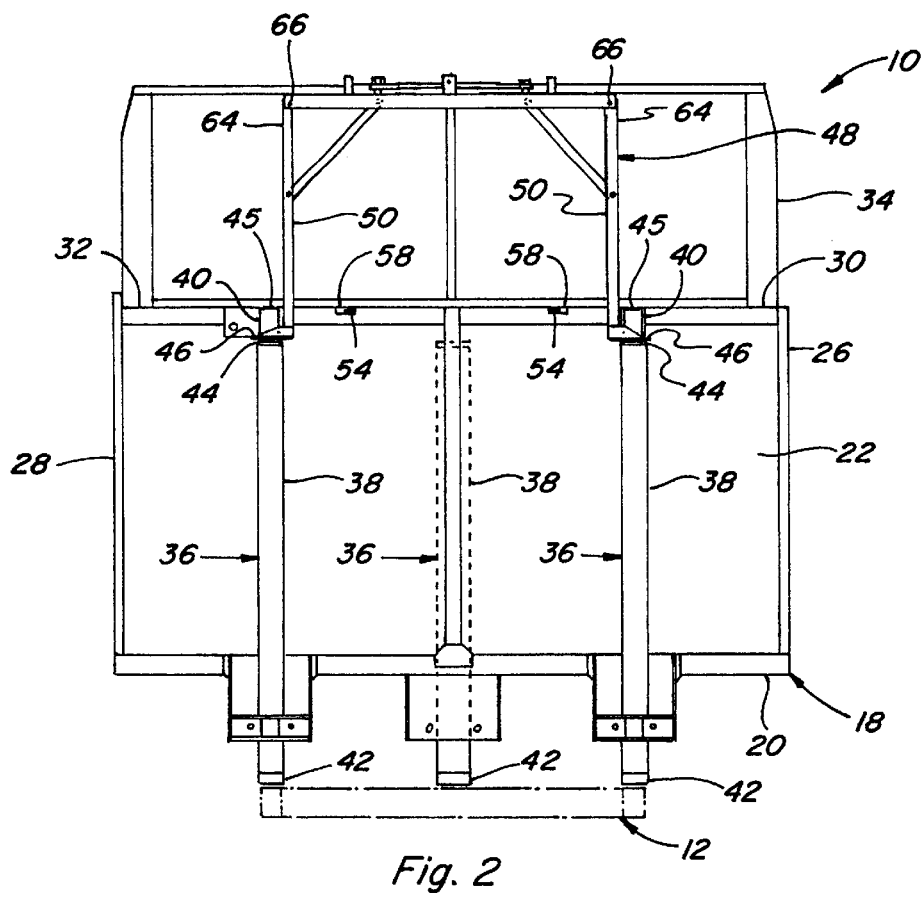
FIG. 2 is another simplified rear elevational view of the harvester of FIG. 1 showing rear legs of the apparatus engaged with rear lifting elements of the harvester for supporting the lid structure in an extended position relative to the basket.

Referring now to the drawings, in FIGS. 1 and 2, a cotton harvester 10 is shown including a mobile frame 12 supported by a plurality of wheels 14 (in phantom) for movement over the ground 16 for harvesting cotton from cotton plants using a plurality of row units (not shown), in the well known, conventional manner. Cotton harvester 10 includes a large, rectangular shape basket 18 for receiving and collecting cotton harvested by the row units, the cotton being blown from the row units to basket 18 through a plurality of ducts by fans (not shown) in the well known, conventional manner.

Basket 18 includes a rectangular bottom peripheral frame structure 20 around the bottom thereof supporting a basket floor (not shown). A rear wall 22 is attached to frame structure 20 and extends upwardly therefrom at a rear end of basket 18. A front wall 24 (FIG. 6) is attached to frame structure 20 and extends upwardly therefrom at the front end of basket 18. A side wall 26 is attached to frame structure 20 and extends between rear wall 22 and front wall 24. A door or second side wall 28 is pivotally mounted to frame structure 20 between rear wall 22 and front wall 24 and is movable between an upwardly extending closed position, as shown, for retaining the cotton in basket 18, and a lowered, open position (not shown) for allowing removing and unloading of the cotton from basket 18. Basket 18 includes an upper peripheral frame structure 30 extending around the periphery thereof and connecting walls 22, 24, and 26 together to provide a unitary basket structure and defining an upwardly facing opening 32. A lid structure 34 is telescopically received in, and at least partially or generally covers, opening 32 so as to be positionable in a stored or retracted position at least partially located within basket 18, as shown in FIG. 1, and in a field or extended position raised a predetermined distance relative to and above basket 18, as shown in FIG. 2.

Cotton harvester 10 includes lifting elements 36 for lifting or raising basket 18 vertically or upwardly relative to mobile frame 12 to facilitate unloading or transfer of the cotton collected in basket 18 to another receptacle, such as a well known conventional module builder, a truck, or the like. Harvester 10 preferably includes three lifting elements 36, disposed at spaced locations around basket 18, although more or fewer lifting elements could be used, at different locations, as desired.

Each lifting element 36 in the present embodiment is a conventional extendable fluid cylinder including an elongate, cylindrical cylinder body 38 having an elongate rod 40 disposed therein for telescopic axial movement relative thereto between a lowered or retracted position (FIGS. 2, 6 and 7), and a raised or extended position (FIG. 1). Lifting elements 36 are connected in the conventional manner to a fluid circuit including a source of pressurized fluid such as a hydraulic oil, controlled in any suitable manner, such as by using valve lever or switch located on harvester 10 in an operator cab thereof or elsewhere. Cylinder bodies 38 each have a bottom end 42 fixedly mounted to frame 12 so as to also extend upwardly at a substantially vertical orientation, a top end 44, and an upper rod end 45 connected to upper peripheral frame structure 30 of basket 18, such that lifting elements 36 are simultaneously extendable to lift or raise basket 18, and simultaneously retractable to lower basket 18, relative to frame 12.

Figure 3:
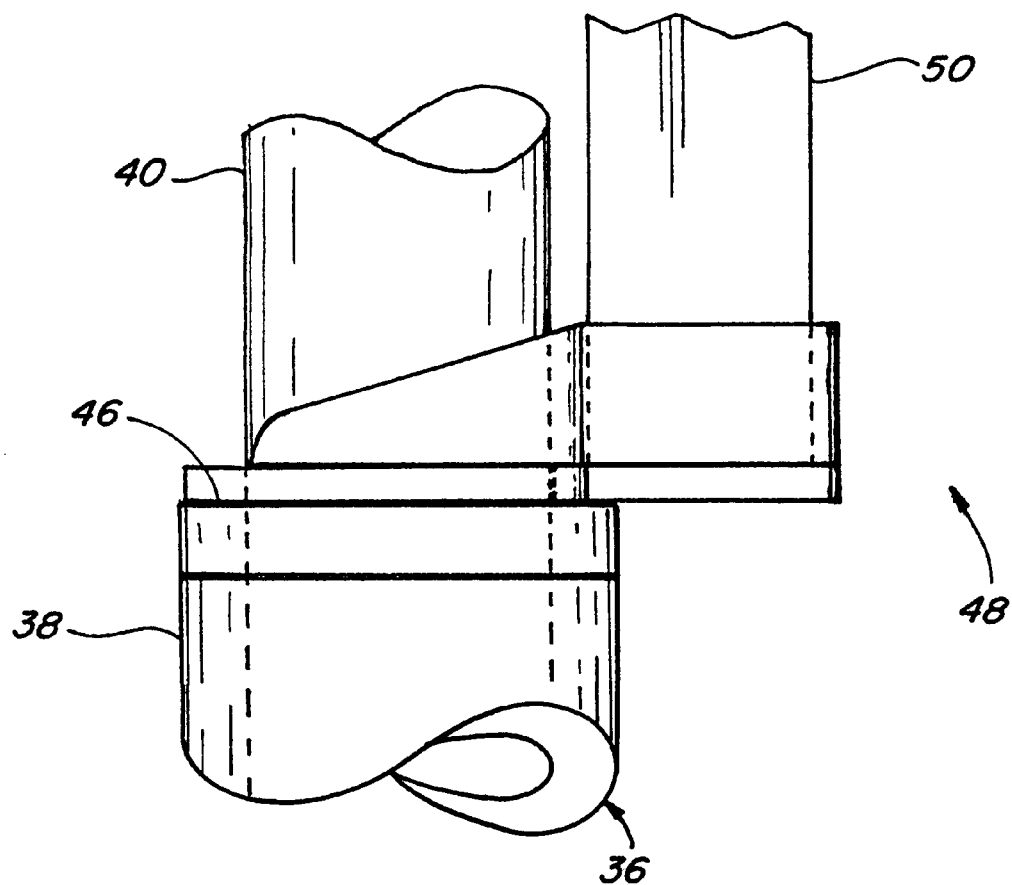
FIG. 3 is an enlarged fragmentary rear elevational view of the cotton harvester and apparatus of FIG. 2, showing one of the rear legs of the apparatus engaged with one of the lifting elements.

Referring also to FIG. 3, top end 44 of cylinder body 38 of each lifting element 36 includes an annular, upwardly facing surface 46, from which rod 40 projects upwardly. Harvester 10 includes apparatus 48 for holding lid structure 34 as basket 18 is lowered relative thereto from a lifted position to a lowered position for extending lid structure 34 from the retracted position shown in FIG. 1 to the extended position shown in FIG. 2, and also for holding lid structure 34 while basket 18 is raised relative thereto to move or retract the lid structure from the extended position to the retracted position. Apparatus 48 includes a plurality of legs, including a pair of rear legs 50, and a single front leg 52 (FIG. 6), pivotally connected to lid structure 34 at locations corresponding to the spaced locations of lifting elements 36 around basket 18, so as to be pivotable from a disengaged position, as denoted by the arrows in FIG. 1, to respective positions in engagement with surfaces 46 of cylinder bodies 38, as illustrated in FIG. 3. To engage legs 50 and 52 with surfaces 46 of cylinder bodies 38 with lid structure 34 in the retracted position, basket 18 is lifted by extending lifting elements 36 to a suitable lifted position, as shown in FIG. 1, and legs 50 and 52 are pivoted to positions above the respective surfaces 46. Then, to engage legs 50 and 52 with the surfaces 46 and position lid structure 34 in the extended position, basket 18 is lowered by retracting lifting elements 36.

Figure 4:
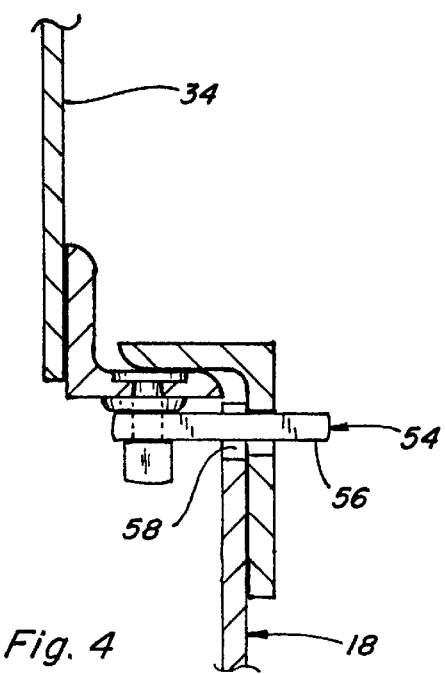
FIG. 4 is a representative cross-sectional view of the basket and lid structure showing a locking element for securing the lid structure in the extended position.
Figure 5:
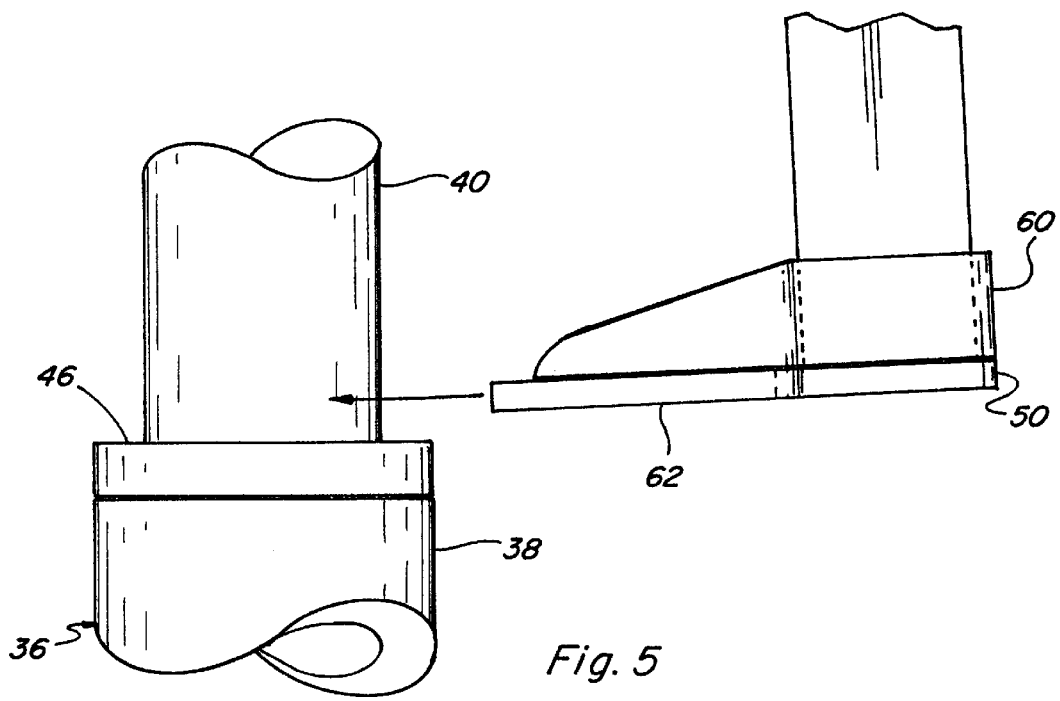
FIG. 5 is an enlarged fragmentary view of the harvester and apparatus showing the rear leg disengaged from the lifting element.

Referring also to FIG. 4, once lid structure 34 is in the predetermined extended position, it can be locked or secured in position using a plurality of conventional locking elements 54 located on lid structure 34 at spaced locations around basket 18, each locking element 54 including a tab 56 mounted on an edge of lid structure 34 and rotatable into a slot 58 in upper peripheral frame structure 30 for supporting lid structure 34 in the well known manner. Once tabs 56 of locking elements 54 are rotated into position for supporting lid structure 34 in the extended position, legs 50 and 52 can be disengaged from cylinder bodies 38 of lifting elements 36 by extending rods 40 of lifting elements 36 to lift legs 50 and 52 above surfaces 46, and legs 50 and 52 pivoted away from cylinder bodies 38, as illustrated by leg 50 in FIG. 5.

Figure 6:
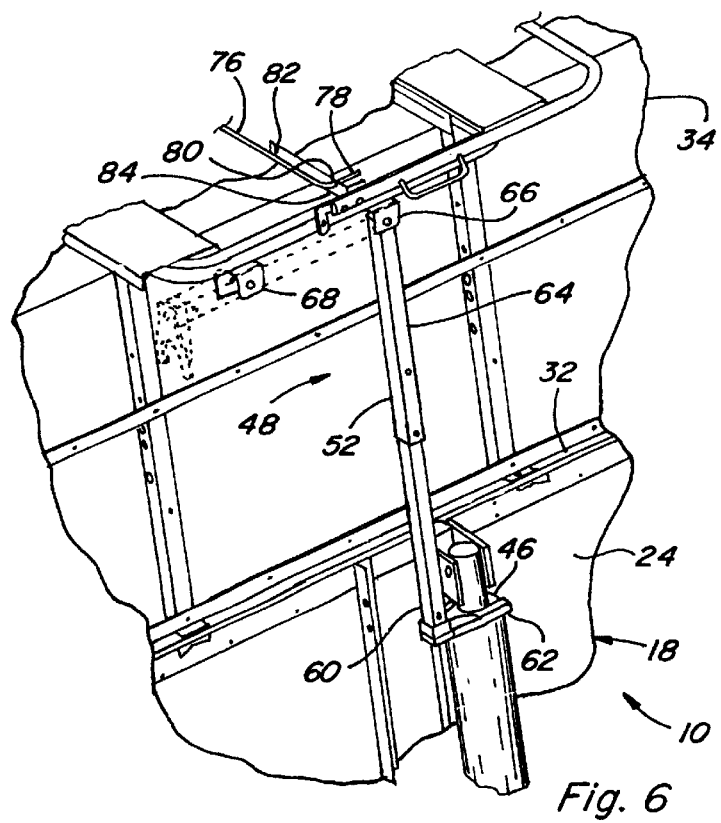
FIG. 6 is a fragmentary perspective view of the front of the basket and lid structure of FIG. 1 showing a front leg of the apparatus engaged with a front lifting element of the harvester.
Figure 7:
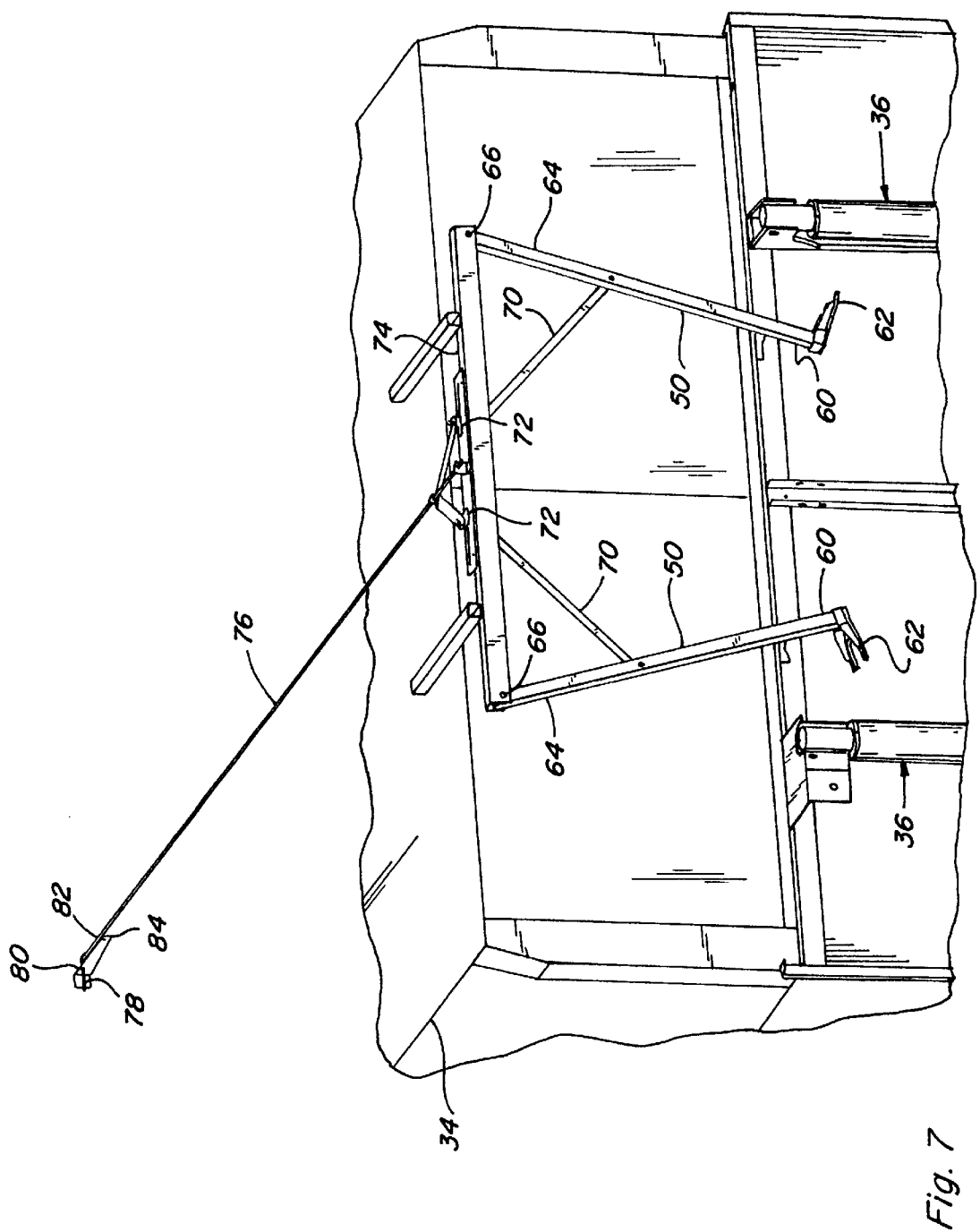
FIG. 7 is a fragmentary perspective view of the rear and top of the basket and lid structure of FIG. 1 showing an arm for engaging and disengaging rear legs of the apparatus from rear lifting elements of the harvester.

Referring also to FIGS. 6 and 7, each of legs 50 and 52 is of rigid construction and is made of a suitable material such as steel, and has a distal end 60 including a two pronged foot 62 extending outwardly therefrom in cantilever relation thereto in position for engaging and resting on surface 46 of the cylinder body 38 with rod 40 received between the prongs. Each of legs 50 and 52 has a proximal end 64 pivotally connected to a bracket on lid structure 34 near the top thereof by a suitable member such as a bolt or pin 66, so as to be suspended outwardly of the adjacent wall of basket 18. Front leg 52 can be a telescoping member as shown such that distal end 60 thereof is telescopically received in proximal end 64, so as to be storable in a shortened length and capable of being extended to a length suitable for engaging surface 46 of the front lifting element. Leg 52 can be held in a generally horizontal position away from surface 46 by a bracket 68. Legs 50 are pivotably connected by arms 70 to slide blocks 72 slidable in a channel 74 and connected to an elongate arm 76 extending from channel 74 to the front of lid structure 34, arm 76 including a bent handle or front end 78 receivable in notches 80 and 82 in a bracket 84 on lid structure 34 for holding arm 76 in a position for holding legs 50 away from lifting elements 36, as shown, and in a position for engaging legs 50 therewith (not shown), respectively, arm 76 being manually or automatically movable between such positions, as desired.

Then, when it is desired to move lid structure 34 back into basket 18 in the retracted position, for instance, for transporting harvester 10 over public roads or the like, basket 18 is positioned using lifting elements 36 so that legs 50 and 52 can be positioned for engaging surfaces 46 of lifting elements 36. The basket is then lowered to engage legs 50 and 52 with lifting elements 36, and locking elements 54 are unlocked. Then, basket 18 is lifted relative to lid structure 34 to receive lid structure 34 in the retracted position and to support lid structure 34. Once the lid structure 34 is fully in the retracted position in the basket 18 and supported thereby, basket 18 is raised further as necessary to allow disengagement of legs 50 and 52 from surfaces 46 of lifting elements 36. The legs 50 and 52 can then be pivoted away from lifting elements 36 and secured in their stored positions, if desired, and the basket 18 lowered as desired, for instance to the lowermost position relative to frame 12.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. In a cotton harvester including a mobile frame supporting a basket for receiving cotton, the basket having an upstanding wall structure defining an upwardly facing opening, a lid structure disposed over the opening and positionable in a retracted position close to the wall structure and in an extended position spaced a predetermined distance above the wall structure, and at least one lifting element having a member extendable for lifting the basket relative to the frame to a lifted position and retractable for lowering the basket from the lifted position, the improvement comprising:

a leg mounted to the lid structure and engageable with a portion of the lifting element when the basket is in the lifted position and the lid structure is in the retracted position so as to hold the lid structure stationary relative to said portion of the lifting element while the basket is lowered from the lifted position to locate the lid structure in the extended position.

2. In the cotton harvester of claim 1, the improvement further comprising the leg being pivotably mounted to the lid structure for movement to a position for engaging said portion of the lifting element.

3. In the cotton harvester of claim 1, the cotton harvester comprising a plurality of the lifting elements located at spaced locations around the basket, and the improvement comprising a plurality of the legs for engaging portions of the lifting elements, respectively.

4. In the cotton harvester of claim 3, the improvement further comprising at least one of the legs being located adjacent one end of the basket and connected to one end of an elongate arm having an opposite end located adjacent to an opposite end of the basket, the arm being movable from the opposite end of the basket for moving said at least one of the legs between a position for engaging the portion of the lifting element and a position spaced from the lifting element.

5. In the cotton harvester of claim 1, the improvement further comprising the leg being engageable with the portion of the lifting element when the lid structure is in the extended position so as to hold the lid structure stationary relative to said portion of the lifting element while the basket is raised to retract the lid structure from the extended position.

6. A cotton harvester, comprising:

a mobile frame;

a cotton receiving basket located on the frame, the basket having a wall extending at least partially therearound defining an upwardly facing opening, and a lid structure disposed in the opening in at least generally covering relation thereto, the basket and the lid structure being movable one relative to the other to extend the lid structure from the basket and to retract the lid structure at least partially into the basket;

at least one lifting element including a first member attached to the frame and a second member attached to the basket, the second member being movable in a first direction relative to the first member for lifting the basket relative to the frame to a lifted position, and the second member being movable relative to the first member in a second direction for lowering the basket from the lifted position; and a leg mounted to the lid structure of the cotton receiving basket and movable into engagement with the first member of the lifting element when the basket is in the lifted position so as to hold the lid structure relative to the first member while the second member is moved in the second direction to lower the basket relative to the lid structure to extend the lid structure.

7. The cotton harvester of claim 6, wherein the leg is mounted to the lid structure for pivotable movement between a first position for engaging the first member of the lifting element and a second position disengaged from the first member.

8. The cotton harvester of claim 7, comprising a plurality of the lifting elements located at spaced locations around the basket, and a plurality of the legs for engaging the first members of the lifting elements, respectively.

9. The cotton harvester of claim 8, wherein at least one of the legs is located adjacent one end of the basket and is connected to one end of an elongate arm having an opposite end located adjacent to an opposite end of the basket and movable from the opposite end of the basket for moving said at least one of the legs between the first and second positions.

10. The cotton harvester of claim 6, wherein the lifting element comprises an extendable fluid cylinder and the first member thereof comprises a cylinder body and the second member comprises a rod telescopically movable in the first direction and the second direction relative to the cylinder body.

11. A cotton harvester, comprising:

a mobile frame;

a cotton receiving basket located on the frame, the basket having a wall structure at least partially therearound defining an upwardly facing opening, and a lid structure disposed in the opening in at least generally covering relation thereto, the basket and the lid structure being movable one relative to the other to extend the lid structure from the basket and to retract the lid structure at least partially into the basket;

a plurality of fluid cylinders disposed at spaced locations around the basket, each of the cylinders having a cylinder body connected to the frame and a rod connected to the basket and movable in an upward direction relative to the cylinder body for lifting the basket relative to the frame to a lifted position and in a downward direction relative to the cylinder body for lowering the basket from the lifted position; and at least one leg mounted to the lid structure of the cotton receiving basket and movable into engagement with the cylinder body of one of the cylinders when the basket is in the lifted position so as to hold the lid structure stationary relative to said cylinder body while the rod is moved in the downward direction for lowering the basket to extend the lid structure from the basket.

12. The cotton harvester of claim 11, wherein the at least one leg is movable into engagement with the cylinder body of one of the cylinders when the lid structure is in an extended position so as to hold the lid structure stationary relative to the cylinder body while the rod is moved in the upward direction for raising the basket relative to the lid structure for retracting the lid structure into the basket.

13. The cotton harvester of claim 11, wherein the cylinder body has an upwardly facing annular surface around the rod and the leg has a pronged portion for engaging said surface.

14. A cotton harvester, comprising:

a mobile frame;

a cotton receiving basket located on the frame, the basket having a wall structure at least partially therearound defining an upwardly facing opening, and a lid structure disposed in the opening in at least generally covering relation thereto, the basket and the lid structure being movable one relative to the other to extend the lid structure from the basket and to retract the lid structure at least partially into the basket;

a plurality of fluid cylinders disposed at spaced locations around the basket, each of the cylinders having a cylinder body connected to the frame and a rod connected to the basket and movable in an upward direction relative to the cylinder body for lifting the basket relative to the frame to a lifted position and in a downward direction relative to the cylinder body for lowering the basket from the lifted position; and at least one leg mounted to the lid structure of the cotton receiving basket and movable into engagement with the cylinder body of one of the cylinders when the basket is in a lowered position and the lid structure is extended from the basket so as to hold the lid structure stationary relative to the cylinder body while the rod is moved in the upward direction for raising the basket to retract the lid structure into the basket.

15. The cotton harvester of claim 14, wherein the at least one leg is movable into engagement with the cylinder body of one of the cylinders when the basket is lifted and the lid structure is retracted so as to hold the lid structure stationary relative to the cylinder body while the rod is moved in the downward direction for lowering the basket relative to the lid structure for extending the lid structure from the basket.

\* \* \* \* \*